US007747777B2

(12) United States Patent
Previdi et al.

(10) Patent No.: US 7,747,777 B2
(45) Date of Patent: Jun. 29, 2010

(54) OPTIMIZING NETWORK RESOURCES USAGE WITHIN AN ADMINISTRATIVE BOUNDARY

(75) Inventors: Stefano Previdi, Rome (IT); Robert Raszuk, Komorow (PL); David Ward, Somerset, WI (US); Jean-Phillippe Vasseur, Dunstable, MA (US)

(73) Assignee: Cisco Technology, Inc., San Jose, CA (US)

( * ) Notice: Subject to any disclaimer, the term of this patent is extended or adjusted under 35 U.S.C. 154(b) by 215 days.

(21) Appl. No.: 11/948,799

(22) Filed: Nov. 30, 2007

(65) Prior Publication Data

US 2009/0144390 A1 Jun. 4, 2009

(51) Int. Cl.
*G06F 15/173* (2006.01)
(52) U.S. Cl. .................. 709/241; 709/238; 709/239; 370/238
(58) Field of Classification Search ......... 709/232–241; 370/351
See application file for complete search history.

(56) References Cited

U.S. PATENT DOCUMENTS 7,457,244 B1 * 11/2008 Ye et al. ................... 370/230

OTHER PUBLICATIONS

Pietzuch, P, et al., "Evaluating DHT Service Placement in Stream-Based Overlays", Proceedings of the International Workshop on Peer to Peer Systems (IPTPS 2005), Feb. 2005, 6 pages.
Sandvine Inc., "Meeting the Challenge of Today's Evasive P2P Traffic", An Industry white paper, Sep. 2004, 16 pages.
Sandvine Inc., "Session Management: BitTorrent Protocol", Application Note, Dec. 2004, 5 pages.
Sandvine Inc., "Peer-to-Peer File Sharing", A Technical Analysis, Mar. 2003, 6 pages.
Morin, M., "Managing P2P Traffic on DOCSIS Networks", Sandvine Inc., Feb. 2002, 16 pages.
Sandvine Inc., "Peer-to-Peer File Sharing", An Industry White Paper, Dec. 2002, 13 pages.
Katz, D., et al., "Traffic Engineering Extensions to OSPF Version 2", Network Working Group, RFC 3630, Sep. 2003, 15 pages.

(Continued)

*Primary Examiner*—Salad Abdullahi
(74) *Attorney, Agent, or Firm*—Hickman Palermo Truong & Becker LLP (57) ABSTRACT

In one embodiment, an apparatus comprises logic for optimizing network resources usage. The logic is operable to store IGP information, where the IGP information includes a set of attribute values associated with each of a set of content servers. When the logic receives a request for content from a remote peer, the logic determines one or more content servers that can provide the requested content. The logic then retrieves, from the IGP information, a plurality of attribute values associated with a non-looping path from each of the one or more content servers. For each of the one or more content servers, the retrieved attribute values include: one or more capacity values indicating capacities of one or more communication links on the non-looping path from that content server; and one or more utilization values indicating utilizations of the one or more communication links on the non-looping path from that content server. The logic then selects a content server based on the retrieved attribute values, and causes the request for the content to be sent to the selected content server.

25 Claims, 6 Drawing Sheets

OTHER PUBLICATIONS

Smit, H., et al., "Intermediate System to Intermediate System Extensions for Traffic Engineering", Network Working Group, Request for Comments 3784, Jun. 2004, 14 pages.

Kompella, K., et al., "OSPF Extensions in Support of Generalized Multi-Protocol Label Switching", Network Working Group, RFC 4203, Oct. 2005, 12 pages.

* cited by examiner

205 Attribute Information

| Content Servers | Path from NE1 | Link Capacity | Link Utilization | Server Capacity | Server Utilization |
|---|---|---|---|---|---|
| ... | | | | | |
| CS1 | (NE6, NE5, NE3, NE2) | (10GBE, 10GBE, OC192, 10GBE) | (8%, 25%, 98%, 20%) | 10GB | 9% |
| CS1 | (NE6, NE5, NE4, NE2)* | (10GBE, 10GBE, OC768, 10GBE) | (8%, 10%, 10%, 20%) | 10GB | 9% |
| CS2 | (NE3, NE2)* | (OC192, 10GBE) | (98%, 20%) | 1GB | 100% |
| CS2 | (NE3, NE5, NE4, NE2) | (10GBE, 10GBE, OC768, 10GBE) | (25%, 10%, 10%, 20%) | 1GB | 100% |
| ... | | | | | |

240 — 242 — 244 — 246 — 248 — 250

233 — 231

Note: * denotes the topologically shortest path of multiple paths from the same content server

OPTIMIZING NETWORK RESOURCES USAGE WITHIN AN ADMINISTRATIVE BOUNDARY

TECHNICAL FIELD

The present disclosure relates generally to network communications.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In data communication networks, it is difficult to optimize network traffic that carries content in part because entities requesting content typically select content servers based on the content availability. For example, the selection of a content server to respond to a request for content is typically based on whether or not a content server stores the requested content. The current mechanisms for selecting content servers presently ignore the processing capabilities of the content servers themselves and the characteristics of the network traffic exchanged between the network infrastructure elements in the underlying network(s) through which content is transferred. Thus, the current mechanisms for selecting content servers do not take into account the network resources that would be used to respond to content requests. In turn, this makes it difficult to predict what types and amounts of network resources a content request would consume and how to optimize the network traffic that is generated in response to such request. This inability to optimize content-carrying network traffic presents problems for Internet Service Provider (ISP) networks because routing network infrastructure elements and related computing elements have not been designed to accommodate the massive amounts of content that is transferred across these networks.

A Peer-To-Peer (P2P) network is one example of a network that is geared specifically to providing various types of content. A typical P2P network is implemented using peers (e.g., software processes executing on computer system hosts) that conceptually are logically overlaid on top of a physical network of network infrastructure elements, such as routers and switches, that are configured to communicate over network protocols such as the Internet Protocol (IP). For example, the peers in a P2P network would typically be interconnected and exchange information over a protocol that operates at a communication stack layer (e.g., an application layer) that is higher than the network and transport layers at which the network infrastructure elements in the underlying physical network operate. In such arrangement, the P2P peers typically do not receive information about the network topology and the traffic dynamics of the underlying physical network, and thus the P2P peers cannot account for network resources when they select with which other P2P peers to communicate. As a result, P2P content might be served from peers (e.g., content servers) that do not have optimal network reachability, and/or the resources in the underlying physical network might not be used optimally.

BRIEF DESCRIPTION OF THE DRAWINGS

Optimizing network resources usage is illustrated by way of example, and not by way of limitation, in the figures of the accompanying drawings and in which like reference numerals refer to similar elements and in which.

DESCRIPTION OF EXAMPLE EMBODIMENTS

Techniques for optimizing network resources usage are described. According to the techniques described herein, network resources usage may be optimized within an administrative boundary. As used herein, "administrative boundary" refers to a collection of one or more physical networks that utilize common Interior Gateway Protocol (IGP) information to route network traffic. The scope of an administrative boundary is determined by the scope of the one or more IGP protocols that govern routing within the boundary. An Autonomous System (AS) operated by an Internet Service Provider (ISP) is one example of an administrative boundary within which the techniques described herein may be implemented. Other examples of administrative boundaries include, without limitation, an Open Shortest Path First (OSPF) area, Intermediate System-to-Intermediate System (IS-IS) level, and a Border Gateway Protocol (BGP) confederate autonomous system.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Functional Overview
   3.0 Optimizing Network Resources Usage
      3.1 Example Operational Context
      3.2 Example IGP Attribute Information
      3.3 Selecting Content Servers Based on IGP Attribute Information
   4.0 Example Embodiments for P2P Networks
   5.0 Example Embodiments for a Network Infrastructure Element
   6.0 Implementation Mechanisms—Hardware Overview
   7.0 Extensions and Alternatives 1.0 General Overview Optimizing network resources usage is described. In an embodiment, an apparatus comprises IGP logic and selection logic that are encoded in one or more tangible media for execution. The IGP logic when executed is operable to store IGP information, where the IGP information comprises a set of attribute values associated with each of a set of content servers. When executed, the selection logic is operable to: receive a request for content from a remote peer; determine one or more content servers, of the set of content servers, that are operable to provide the content; retrieve, from the IGP information, a plurality of attribute values associated with a non-looping path from each content server of the one or more content servers to the remote peer, where the plurality of attribute values associated with that content server include: one or more capacity values indicating capacities of one or more communication links on the non-looping path from that content server, and one or more utilization values indicating utilizations of the one or more communication links on the non-looping path from that content server; select a particular content server of the one or more content servers based on the attribute values retrieved for each content server of the one or more content servers; and cause the request for the content to be sent to the particular content server.

Other embodiments comprise a method and computer-readable media encoded with logic for optimizing network resources usage according to the techniques described herein.

In some embodiments, the described techniques for optimizing network resources usage may be implemented using one or more computer programs executing on a network infrastructure element (also referred to hereafter as just "network element"), such as a switch or a router, that is configurable in a packet-switched network. In some embodiments, the techniques described herein may be implemented by using one or more computer programs executing a computer system that is communicatively coupled to a network element and is configured for receiving IGP information from the network element. In general, the techniques described herein may be implemented by any network-enabled entity that is operable to use the requisite IGP information, and for this reason the embodiments described herein are to be regarded in an illustrative rather than a restrictive sense.

2.0 Functional Overview

Figure 1:
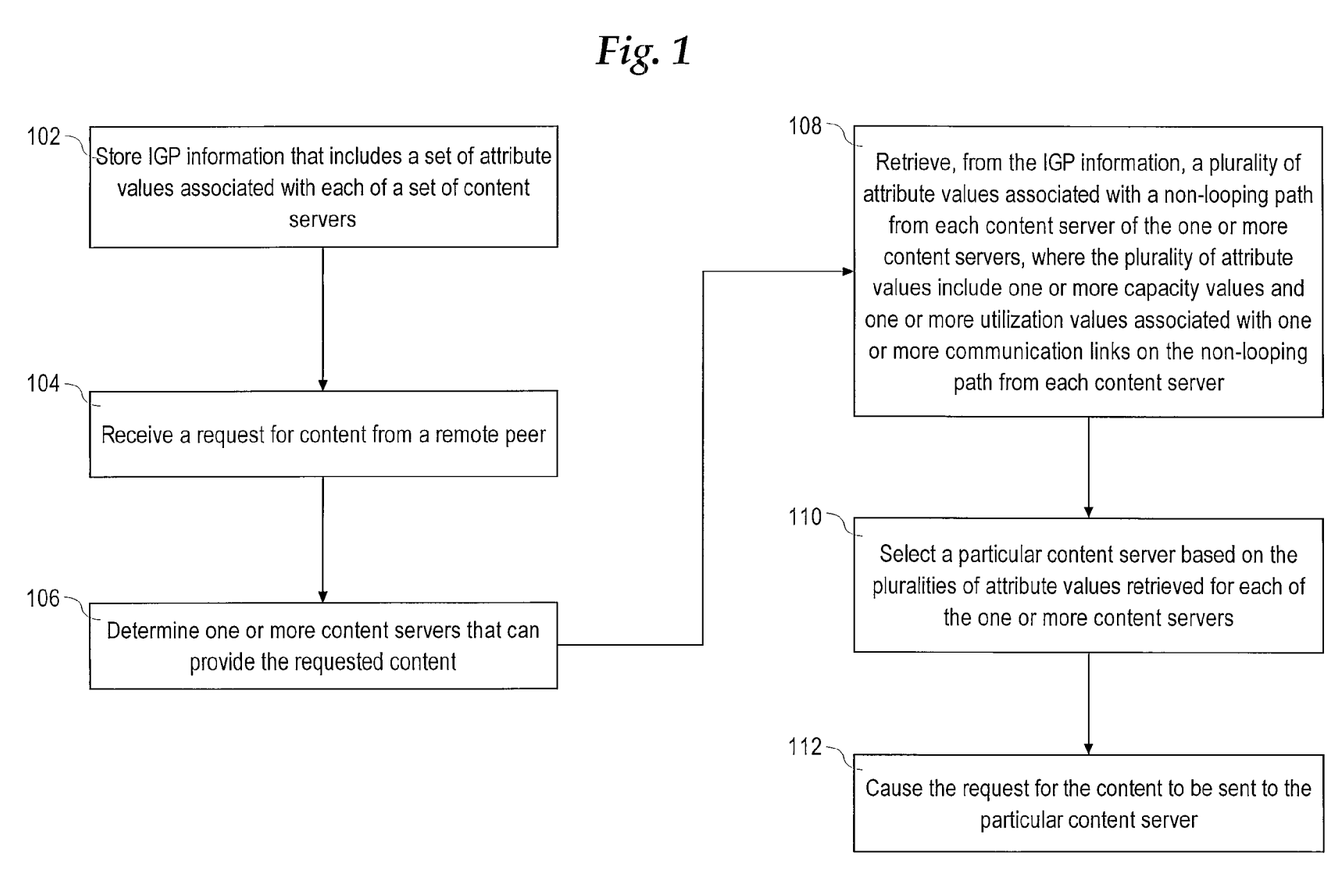
FIG. 1 illustrates an example method of optimizing network resources usage according to one embodiment.

FIG. 1 illustrates an example method of optimizing network resources usage in an administrative boundary.

In step 102, IGP information is stored. As used herein, "IGP information" refers to information that is distributed over an interior gateway protocol. Examples of interior gateway protocols include, without limitation, the OSPF protocol and the IS-IS protocol. Typically, IGP information comprises of routing information that is used by a network element to route network traffic within a network. In addition to routing information, according to the techniques described herein the IGP information being stored further comprises attribute information that includes one or more sets of attribute values that are respectively associated with one or more content servers that are reachable within an administrative boundary.

As used herein, "server" refers to a combination of software components and hardware components that are operable to provide various functionalities on behalf of networked entities such as, for example, clients of the server. "Content server" refers to a combination of software and hardware components that are operable to provide content in response to requests from various network entities. Various examples of content that can be provided by a content server include, but is not limited to, data in various forms such as files and data streams, audio information in various forms such as audio files and audio streams in various formats, and video information in various forms such as video files, streaming video, and video on demand.

In step 104, a request for content is received from a remote peer. As used herein, "peer" refers to a software process that is executing on a network-enabled device. Examples of network-enabled devices include, without limitation, various types of computer systems (e.g., desktop computers, laptop computers), network elements, mobile telephones, and Personal Digital Assistants (PDAs).

In step 106, a determination is made of one or more content servers that can provide the requested content. The one or more content servers may be determined by using any available mechanism; the techniques described herein are not limited to using any particular mechanism for determining which content servers are operable to provide a requested content.

In step 108, a plurality of attribute values are retrieved from the stored IGP information, where the plurality of retrieved attribute values include attribute values that are associated with a non-looping path from each of the one or more content servers that can provide the requested content to the receiver of the content. The attribute values for each of the one or more content servers include at least: one or more capacity values indicating capacities of one or more communication links on the non-looping path from that content server; and one or more utilization values indicating utilizations of the one or more communication links on the non-looping path from that content server.

In step 110, a particular content server is selected based on the pluralities of attribute values that are retrieved for each of the one or more content servers that can provide the requested content. In selecting the particular content server, a non-looping path from that content server down to the receiver of the content is evaluated as it is this path through the network that the content will effectively take to reach the receiver. For example, based on the pluralities of retrieved values, a service request and selection logic may be executed to determine which content server, of multiple content servers that can provide the requested content, would be able to provide the requested content with an optimal usage of the communication links to any of the multiple content servers. In some embodiments, in selecting a content server, the service request and selection logic may take into account other attribute values from the plurality of attribute values retrieved from the stored IGP information such as, for example, the capacities and the utilizations of the multiple content servers that can provide the requested content.

In step 112, the received request for content is sent or caused to be sent to the particular content server. Thereafter, in response to the request for content, the particular content server would send the requested content over the evaluated non-looping path from that server to the receiver of the content.

According to the techniques described herein, in some embodiments the example method illustrated in FIG. 1 may be performed by a network element, such as a switch or a router, in order to optimize the network resources expended in servicing various types of content requests. Examples of such requests include, without limitation, file download requests, audio requests, and video requests for streaming video or video on demand. In other embodiments, the example method illustrated in FIG. 1 may be performed by a computer host that executes a peer in a P2P network that is operable to request various types of content from other peers of the P2P network. In these embodiments, by performing the method illustrated in FIG. 1 the computer host ensures that requests for content would be sent to those peers that would be able to respond to the request by using an optimal amount of network resources.

3.0 Optimizing Network Resources Usage

The techniques described herein for optimizing network resources usage may be implemented in an administrative boundary that uses one or more IGP protocols to distribute IGP routing information to the network elements within the boundary. According to the techniques described herein, along with routing information the one or more IGP protocols also distribute attribute information that comprises sets of attribute values that are respectively associated with various network entities and/or with communication links on the network paths to these entities. Techniques for distributing attribute information over IGP protocols are described in U.S. patent application Ser. No. 11/449,162, titled "TECHNIQUE FOR OPTIMIZED ROUTING OF DATA STREAMS ON AN IP BACKBONE IN A COMPUTER NETWORK", filed by Stefano Previdi et al. on Jun. 8, 2006.

3.1 Example Operational Context

Figure 2A:
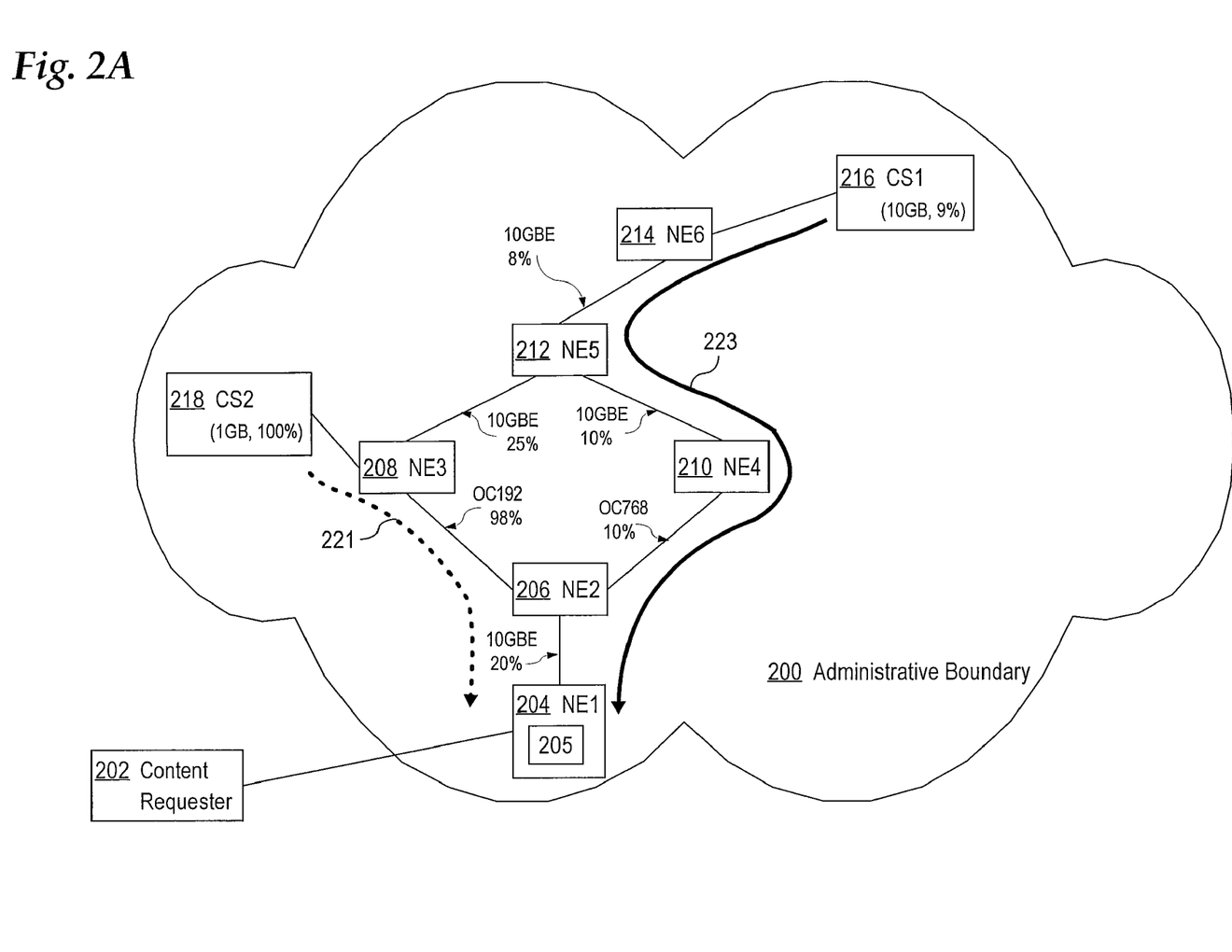
FIG. 2A illustrates an example operational context.

FIG. 2A illustrates an example operational context in which the techniques described herein may be implemented. Administrative boundary 200 comprises one or more networks that are configured to carry various types of network traffic and to provide access to various types of networked application services. For example, in some embodiments the one or more networks in administrative boundary 200 may comprise the enterprise network of an ISP that provides Internet access to various business, governmental, and educational organizations and/or to individual users. In these embodiments, various clients that use the services of the ISP network may be configured to exchange various types of content in one or more P2P overlay networks. In other embodiments, the one or more networks in administrative boundary 200 may comprise the enterprise network of a cable service provider that provides video on demand and other cable services to various customers. In general, the techniques described herein may be implemented to optimize network resources usage in any administrative boundary within which various types of content are transferred and/or various types of content-oriented application services are provided.

As illustrated in FIG. 2A, administrative boundary 200 comprises one or more networks that comprise network elements 204 ("NE1"), 206 ("NE2"), 208 ("NE3"), 210 ("NE4"), 212 ("NE5"), and 214 ("NE6"). In an example embodiment, network elements 204, 206, 208, 210, 212, and 214 may be routers that are configured to exchange routing information over one or more IGP protocols such as, for example, OSPF and IS-IS. Administrative boundary 200 also comprises one or more content servers, such as content servers 216 ("CS1") and 218 ("CS2"), which are communicatively connected to and are reachable through one or more of the network elements in the administrative boundary.

According to the techniques described herein, one or more of network elements 204, 206, 208, 210, 212, and 214 may also be configured to receive, over one or more IGP protocols, attribute values associated with one or more of the content servers for which the network elements provide reachability. For example, network element 204 may store IGP information in a routing database such a Shortest Path Tree (SPT) data structure or a Routing Information Base (RIB). In addition to routing information, the IGP information stored in network element 204 would also include attribute information 205 that comprises various attribute values that are associated with communication links among the network elements within administrative boundary 200 as well as with various content-providing entities such as content servers 216 and 218.

As an operational example suppose that a content requester, such as content requester 202, sends a request for content that is provided by a content server within administrative boundary 200. Content requester 202 may be a P2P peer and the request for content may identify another P2P peer (e.g., a content server) by a network address (e.g., an IP address and/or a TCP port number) that is within administrative boundary 200.

Network element 204 receives the request from content requester 202. Since network elements 204 is participating in the one or more IGP protocols that distribute IGP information within administrative boundary 200, network element 204 has visibility into the network topology of the network(s) within the administrative boundary. In addition, according to the techniques described herein, network element 204 also stores attribute information 205 which is distributed within the IGP information received over the IGP protocols operating within administrative boundary 200. So when network element 204 receives the request for content from content requester 202, according to the techniques described herein network element 204 is capable of looking up the destination network address specified in the request into the stored IGP information to determine and select a content server that can service the request with an optimal usage of the network resources that would be expended to transfer content in response to the request.

For example, network element 204 (or a component thereof) may first look up the destination address of the received request to determine to which content server the request is sent. Suppose the request is sent to content server 218. Next, network element 204 may also determine one or more other content servers within administrative boundary 200 that can service the request. Suppose that network element 204 determines that content server 216 is also able to service the request. Network element 204 may then inspect the IGP routing information stored in a SPT data structure to determine one or more non-looping paths from each of content servers 216 and 218 to network element 204. As illustrated in FIG. 2A, the shortest, non-looping path from content server 216 is path 223 (NE6, NE5, NE4, NE2), which is assumed to have a link-cost of 13. The shortest, non-looping path from content server 218 is path 221 (NE3, NE2), which is assumed to have a link-cost of 8.

Network element 204 (or a component thereof) may then execute a service request and selection logic to select one of content servers 216 and 218 to service the request received from content requester 202. According to the techniques described herein, when executed the service request and selection logic may take into account the attribute information that is stored for each of the one or more non-looping paths that are determined from each of content servers 216 and 218 to network element 204. In addition, the service request and selection logic may also take into account any attribute information that is associated with content servers 216 and 218.

For example, when executed, the service request and selection logic may determine that content server 218 is topologically closer to network element 204 than content server 216 because the link-cost (8) of path 221 from content server 218 is lower than the link-cost (13) of path 223 from content server 216. In addition, according the techniques described herein, the service request and selection logic may also inspect the stored attribute information associated with content servers 216 and 218 such as: attribute information associated with the capacities and utilization of the communication links on paths 223 and 221, and/or attribute information associated with the capacities and utilizations of content servers 216 and 218. For example, the service request and selection logic may make a determination that the communication link between network elements 206 (NE2) and 208 (NE3) is a OC192 optical link (with a maximum capacity of 10 Gbps) that is utilized at 98%, while the communication link between network elements 206 (NE2) and 210 (NE4) is a OC768 optical link (with a maximum capacity of 40 Gbps) that is utilized at 10%. In addition, the service request and selection logic may also make a determination that content server 218 is running at a 100% of CPU utilization, while content server 216 is running at 9% of CPU utilization. Based on these two determinations, the service request and selection logic may decide that content server 216 is a better choice to service the request than content server 218 because content server 216 is less utilized than content server 218 and because the communication links on the shortest path from content server 216 to network element 204 are overall less utilized and have more spare capacity than the communication links on the shortest path from content server 218. Thus, the service request and selection logic would select content server 216 to service the request sent from content requester 202 even though content server 218 is topologically closer to network element 204.

After selecting content server 216, network element 204 would forward the request received from content requester 202 to content server 216. In selecting content server 216, network element 204 ensures that: (1) the request would be serviced by a content server that has the optimal available capacity to service the request; and (2) that the content returned in response to the request would be transferred through the network over path 223, the communication links of which have the optimal combination of capacity and available bandwidth to carry the content. As a result, better load-balancing of content-carrying network traffic is achieved through the network(s) that comprise administrative boundary 200.

In contrast to the techniques described in the above example, conventional mechanisms for selecting content servers are based only on metrics that do not account for communication link capacity and utilization and/or for content server capacity and utilization. For example, if in the example above network element 204 had used a conventional mechanism, network element 204 would have selected to send the request received from content requester 202 to content server 218 over path 221 because path 221 is the topologically shortest path to a content server that can service the request. Since, however, content server 218 has no capacity to service the request and at least one communication link to that server has limited available bandwidth, it is clear that the techniques described herein provide for a more optimal usage of network resources than the conventional mechanisms for selecting content servers.

It is noted that any network element in FIG. 2A may be configured to perform the techniques for optimizing network resources usage that are described above with respect to network element 204. For example, in some operational contexts only network elements at the edges of an administrative boundary (for example, Autonomous System Border Routers, or ASBRs) may be configured to perform the techniques described herein. In other operational contexts, any network element that is configured to receive IGP information distributed within an administrative boundary may be configured to perform the techniques described herein. For this reason, the example embodiment described above with respect to network element 204 in FIG. 2A is to be regarded in an illustrative rather than a restrictive sense.

It is also noted that the attribute information 205 depicted in FIG. 2A with respect to content servers and network elements illustrates the state of the network(s) in administrative boundary 200 at a particular point in time—for example, at a time just prior to the time at which network element 204 receives the request from content requester 202. Since the techniques described herein use attribute values that are distributed over IGP protocols, the techniques described herein ensure that for any content request the selection of a content server is going to be made based on the latest attribute information that is available in the administrative boundary.

3.2 Example IGP Attribute Information

To make optimal selection of content servers and paths therefrom, the techniques described herein use attribute information that is propagated within an administrative boundary over one or more IGP protocols. The attribute information may be propagated to the network elements in the administrative boundary in IGP protocol messages, and updates to the attribute information may be propagated periodically, at pre-scheduled time intervals, or at certain times when such information becomes available. In various embodiments, the attribute information may include attribute values that are associated with content servers and/or with the communication links on the network paths from such content servers to content receivers.

In some embodiments, the attribute values associated with a content server may include one or more capacity values that indicate the capacity of the content server and one or more utilization values that indicate the current workload of the content server. As used herein, "capacity" refers to a metric which indicates an amount or type of a physical characteristic. For example, a capacity value of a content server may indicate various characteristics of the server including, but not limited to, number of CPUs, maximum CPU speed, amount of physical memory, amount of disk space, and maximum number of allowed incoming network connections. In some implementations, the capacity of a content server may be expressed as an overall value that is calculated or otherwise determined based on a combination of multiple values indicating the various characteristics of the server.

As used herein, "utilization" refers to a metric which indicates a usage of a physical characteristic. For example, a utilization value of a content server may indicate the usage of a particular characteristic of the server at a particular time including, but not limited to, percentage of time CPUs are used, percentage of physical memory used, and percentage of disk space used. In some implementations, the utilization of a content server may be expressed as an overall value that is calculated or otherwise determined based on a combination of multiple values indicating the usage of the various physical characteristics of the server.

In some embodiments, attribute information associated with the communication links on the network paths from content servers may be stored. The attribute information may include one or more capacity values that indicate the capacities of one or more communication links to a content server and one or more utilization values that indicate the currently used bandwidth on the one or more communication links. For example, a capacity value of a communication link may indicate the type and maximum bandwidth of the communication link such as, for example, an optical link (e.g., optical link OC48 with a maximum bandwidth of 2.488 Gbps, optical link OC768 with a maximum bandwidth of 40 Gbps, and an Ethernet link with a maximum capacity of 10 GB). A utilization value of a communication link may indicate percentage of link bandwidth that is used at a particular time. The utilization values of a particular link may be measured directly by the network elements that share the link, or may be derived by the network elements based on information that is measured for the network traffic flows that are being transferred over the link during a given interval of time.

Figure 2B:
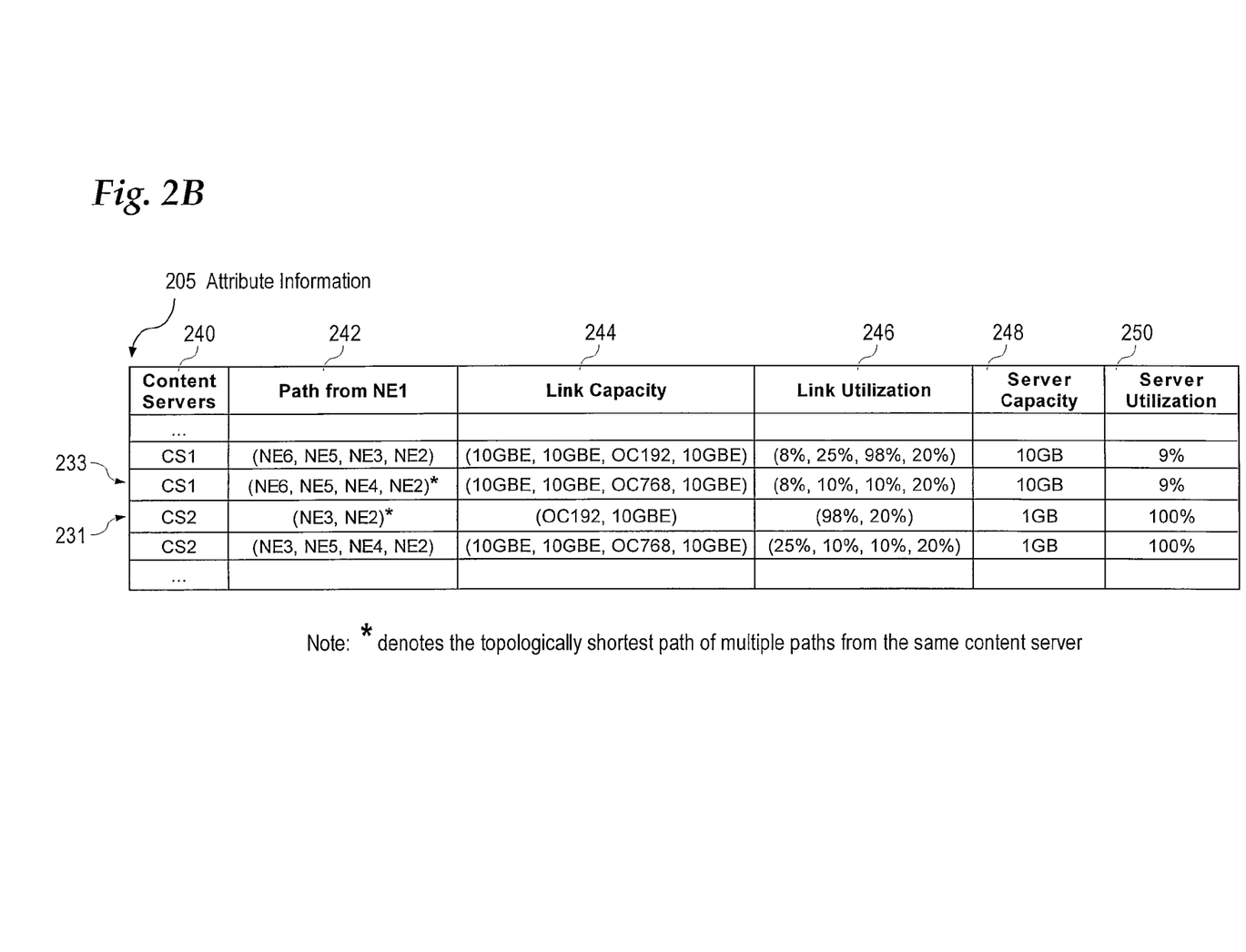
FIG. 2B illustrates an example IGP attribute information that may be used to optimize network resources usage in the example operational context of FIG. 2A.

FIG. 2B illustrates an example attribute information that may be used to optimize network resources usage in the example operational context of FIG. 2A. For illustration purposes, attribute information 205 in FIG. 2B is depicted a table; however, the techniques described herein are not limited to storing attribute information in a table, and any data structure that can store data may be used. For example, in embodiments in which IGP information is generally stored in a SPT data structure, the attribute information distributed over IGP protocols may also be stored within the SPT data structure in association with the network entity to which it pertains—that is, capacity and utilization attribute values of content servers may be stored in the SPT data structure in the nodes that respectively represent the content servers, and capacity and utilization attribute values of communication links may be stored in the SPT data structure in the nodes (or edges) that respectively represent the communication links between network elements.

As illustrated in FIG. 2B, attribute information 205 comprises: field 240 that is configured to store content server identifiers; field 242 that is configured to store path information identifying a path from a content server identified in the corresponding field 240; field 244 that is configured to store the capacity of each of the links of the path identified in the corresponding field 242; field 246 that is configured to store the utilization of each of the links of the path identified in the corresponding field 242; field 248 that is configured to store the capacity of the content the server identified in the corresponding field 240; and field 250 which is configured to store the utilization of the content the server identified in the corresponding field 240.

For example, with reference to FIG. 2A, record 233 identifies: content server 216 in field 240 ("CS1"); non-looping path 223 from that server in field 242 (path "(NE6, NE5, NE4, NE2)"); the link capacity of the communication links on path 223 (corresponding link capacities "(10 GBE, 10 GBE, OC768, 10 GBE)"); the link utilization of the communication links on path 223 (corresponding link utilizations "(8%, 10%, 10%, 20%)"); the server capacity of content server 216 ("10 GB"); and the server utilization of content server 216 ("9%"). Similarly, record 231 identifies: content server 218 in field 240 ("CS2"); non-looping path 221 to that server in field 242 (path "(NE3, NE2)"); the link capacity of the communication links on path 221 (corresponding link capacities "(OC192, 10 GBE)"); the link utilization of the communication links on path 221 (corresponding link utilizations "(98%, 20%)"); the server capacity of content server 218 ("1 GB"); and the server utilization of content server 218 ("100%").

It is noted that the values stored in attribute information 205 reflect the state of the network and the content servers at a particular point in time, for example, the attribute information that is most current at a given point in time. Since attribute information 205 is distributed within IGP protocol messages along with routing information, the attribute values depicted in attribute information 205 are subject to changes in response to receipt of IGP messages that include updated information. It is also noted that the types of attribute values depicted in attribute information 205 are not exhaustive, and various embodiments and implementations may store a variety of additional and/or different types of attributes. For example, the content server identifiers stored in field 240 may be network addresses that comprise IP addresses and/or TCP port numbers, and the network paths stored in field 242 may express the paths by using the network addresses of the network elements on these paths. Thus, the types of attribute values depicted in FIG. 2B are to be regarded in an illustrative rather than a restrictive sense.

For example, in some embodiments the attribute values stored in attribute information used by the techniques described herein may include various Traffic Engineering (TE) metrics that are propagated as attribute extensions in IGP protocol messages. Examples of such TE metrics and mechanisms for distributing such TE metrics over the OSPF protocol are described in *RFC*3630, titled "*Traffic Engineering (TE) Extensions to OSPF Version 2*" which was published by the Internet Engineering Task Force (IETF) in September 2003. Examples of TE metrics and mechanisms for distributing such TE metrics over the IS-IS protocol are described in *RFC*3784, titled "*Intermediate System to Intermediate System (IS-IS) Extensions for Traffic Engineering (TE)*" which was published by the IETF in June 2004.

In another example, in some embodiments the attribute values stored in attribute information used by the techniques described herein may include various TE metrics that are propagated as attribute extensions in OSPF protocol messages in support of carrying link state information for Generalized Multi-Protocol Label Switching (GMPLS). Examples of such TE metrics include, without limitation, reserved bandwith in an MPLS tunnel and ability to reserve bandwith in an MPLS tunnel. Examples of other TE metrics and mechanisms for distributing such TE metrics over the OSPF protocol are described in *RFC*4203, titled "*OSPF Extensions in Support of Generalized Multi-Protocol Label Switching (GMPLS)*" which was published by the Internet Engineering Task Force (IETF) in October 2005.

3.3 Selecting Content Servers Based on IGP Attribute Information

According to the techniques described herein, a service request and selection logic is operable to select a content server based on attribute information that is distributed over one or more IGP protocols within an administrative boundary. The service request and selection logic is not limited to using attribute information in any particular manner; rather, the service request and selection logic may use the attribute information in any now known or later developed mechanism or algorithm. For example, the manner in which the service request and selection logic uses attribute information to select a content server may depend on various embodiment-dependent and/or implementation-dependant characteristics including, but not limited to, the nature and/or type of content transferred within the administrative boundary, the amount of content transferred, the nature and/or type of non-content network traffic (or lack thereof) transferred within the administrative boundary, the type of communication links used in the network(s) within the administrative boundary, the type of network elements used within the administrative boundary, and the type of content servers and/or application services accessible through the network(s) in the administrative boundary.

For example, in some embodiments it may be more important to load-balance traffic within a network than to load-balance the workload of content servers accessible through the network. Thus, in these embodiments the service request and selection logic executed by network elements may give greater weight to attribute information of communication links than to attribute information of content servers when selecting a content server in response to a request for content. An example of an operational context in which load-balancing of network traffic may be preferred to load-balancing of content server workload is an ISP enterprise network which transfers P2P content for one or more P2P overlay networks in addition to regular network traffic for the various customers of the ISP.

In other embodiments the opposite may be true—it may be more important to load-balance the workload of content servers than to load-balance the traffic within a network. Thus, in these embodiments the service request and selection logic executed by network elements may give greater weight to attribute information of content servers than to attribute information of communication links when selecting a content server in response to a request for content. An example of an operational context in which load-balancing of content server workload may be preferred to load-balancing of network traffic is a cable provider network that is configured to provide video on demand services.

In yet other embodiments, load-balancing of traffic within a network may be of the same importance as load-balancing of the workload on content servers accessible through the network. Thus, in these embodiments the service request and selection logic executed by network elements may give equal weight to both attribute information of content servers and attribute information of communication links when selecting a content server in response to a request for content. An example of an operational context in which load-balancing of content server workload may be of the same importance as load-balancing of network traffic is an ISP network that transfers roughly equal amounts of content and non-content traffic.

In some embodiments, a service request and selection logic may be operable to select a content server by evaluating a set of rules based on thresholds associated with the different types of the stored attribute information. For example, if a content server originally addressed in a content request is utilized at greater than 90% of capacity, and the utilization of at least one communication link to that content server is greater than 90%, then the service request and selection logic would select another content server that has more available capacity. However, if the originally requested content server is utilized at 90% of capacity, but the communication link thereto is utilized at 10%, then the service request and selection logic may nevertheless select the original server in order to preserve the network resources.

In some embodiments, a service request and selection logic may be operable to select a content server by computing an overall selection value based on a formula that uses different weights for multiple types of attribute information. For example, separate weight values may be assigned to attribute values of communication links capacity, communication link utilization, content server capacity, and content server utilization; then, an overall selection value may be computed for each content server that can provide a requested content by summing the products of the multiplications of weights and the corresponding attribute values associated with each path; finally, the content server associated with the highest (or lowest, depending on how the separate weights are assigned) overall value may be selected.

In some embodiments, a service request and selection logic implemented according to the techniques described herein may be operable to select a content server based on one or more specific criteria. Examples of such criteria include, but are not limited to, lowest content server utilization, highest content server capacity, lowest communication link utilization, and highest communication link capacity. In some embodiments, the service request and selection logic may take into account individual hops on the network path from a content server that content will take to reach a receiver, or may take into account an overall utilization of all hops on the network path.

In some embodiments, a service request and selection logic may be operable to select a content server based on a combination of the most current attribute information and any corresponding historical attribute information. For example, in some operational contexts attribute information associated with communication links in a network may be periodically (e.g., every 15 minutes) flooded over an IGP protocol. The attribute information received within each 15-minute period may be stored separately in a historical manner. Thus, when a request for content is received, the service request and selection logic may inspect and compare the most current attribute information for the communication links on a particular network path and the corresponding attribute information for the previous 15-minute period in order to determine whether network traffic on one or more links on the particular path has increased or decreased within the preceding time period. The service request and selection logic may then take the obtained result into account when selecting a content server that can service the request (for example, a candidate network path may not be selected if network traffic on one or more links thereof has been increasing during one or more previous 15-minute periods; conversely, a candidate network path may be selected if network traffic on one or more links thereof has been steadily decreasing in the previous 15-minute periods).

4.0 Example Embodiments for P2P Networks

In some embodiments, the techniques for optimizing network resources usage described herein may be implemented in a computer host that is operable to execute a P2P peer. The P2P peer may be configured to participate in one or more P2P overlay networks that operate over one or more P2P protocols. Examples of such P2P networks include, but are not limited to, P2P networks that use the Fast Track, eDonkey, Gnutella, BitTorrent, and Skype protocols and research networks such as Chord and Tapestry.

In these embodiments, the computer host executing the P2P peer may be a node in the P2P network. The P2P network may operate over any P2P protocol including protocols that do not require a central directory or a central server. In addition, the computer host implementing the techniques described herein does not need to be a network element such as a switch or a router, but may be any computer host that is operable to receive, store, and maintain IGP information that includes attribute information which may be used to optimize network resources usage in the network(s) of an administrative boundary.

For example, the computer host may include one or more software and/or hardware components that are operable to receive the IGP information from a network element such as a router. When sending IGP messages to the router, the computer host may include information in the IGP messages which would cause the router to not forward any network traffic to the computer host. (For example, the OSPF protocol provides for an overload bit which, when set in a OSPF message, would cause the router that receives the message not to forward any network traffic to the sender of the message. The IS-IS protocol provides a similar functionality through the "link max" metric which can be used to prevent an IS-IS participant from being a transit node that forwards network traffic.) The router would send to the computer host only IGP information and updates thereto; thus, the computer host would effectively be in a IGP "listen-only" mode that would provide the computer host with network topology visibility but would not require the computer host to forward any transit traffic. In this manner, the computer host may use the IGP information received from the router to compute routes to other P2P peers in the P2P network(s) in which the computer host (or any peer executing thereon) is participating. Further, the computer host may include a service request and selection logic that is operable according to the techniques described herein to select other P2P peers (e.g., content servers) based on attribute information that is distributed within the IGP information received from the router. This allows the IGP-participating computer host to run any application-layer P2P protocol such as BitTorrent, Skype, etc., and still use the techniques described herein.

When the IGP-participating computer host receives a P2P request from another P2P peer, the computer host (or its service request and selection logic) may select a particular P2P peer from multiple P2P peers that can service the request. After selecting a P2P peer, depending on the underlying P2P protocol and/or on the role of the computer host in the P2P network, the computer host can either forward the received P2P request to the selected P2P peer, or respond to the requester with information indicating that the requester needs to re-write the P2P request and re-send it to the selected P2P peer.

Figure 3A:
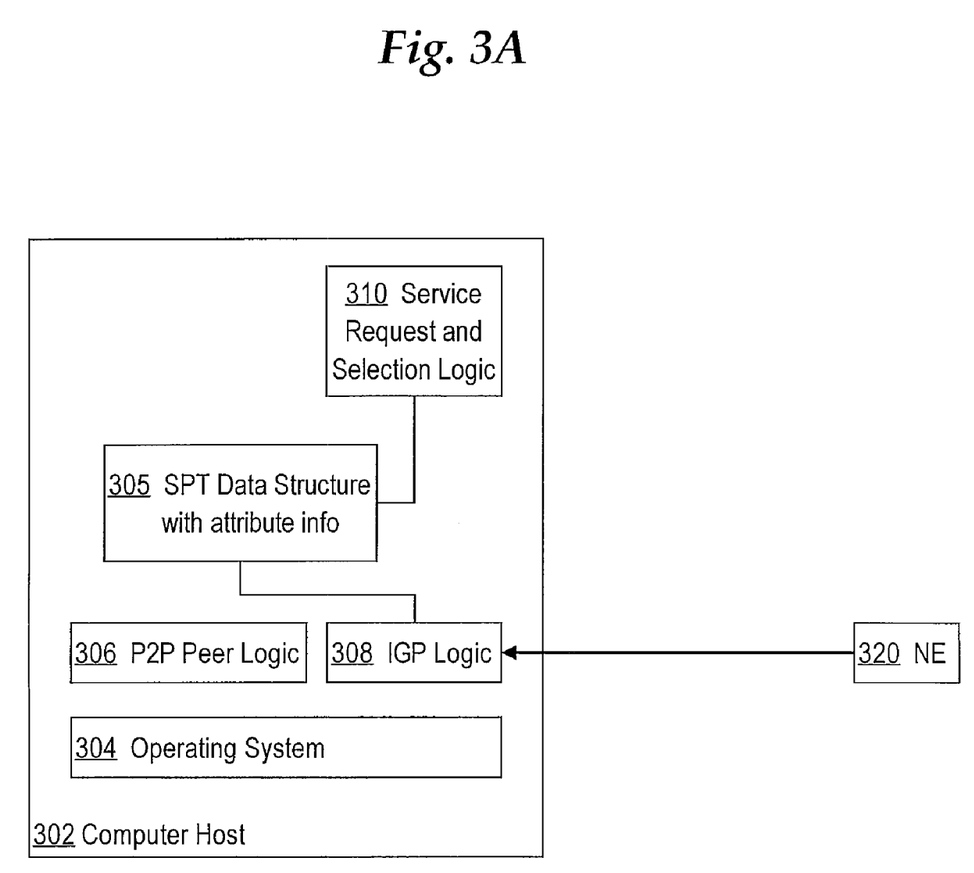
FIG. 3A illustrates an example computer host according to one embodiment.

FIG. 3A illustrates an example computer host according to an embodiment implemented for a P2P network. Computer host 302 comprises a computer system that is operable to execute operating system 304 and P2P peer logic 306.

Operating system 304 may be any type of operating system including, but not limited to, a Unix operating system, a Linux operating system, and a Windows-based operating system. Operating system 304 includes components that are operable to provide the low level functionalities relied upon by the other components in computer host 302. For example, operating system 304 may include various kernel components that are operable support the execution of various system and user-level processes, daemons, services, programs, and applications. In addition, operating system 304 may also include one or more components that are operable to provide network connectivity for the various processes executing on computer host 302 such as, for example, TCP/IP modules for supporting TCP/IP connectivity.

P2P peer logic 306 is a set of one or more components operable to provide connectivity to, and/or participation in, one or more P2P networks. For example, P2P peer logic 306 may be configured as a central directory or server that is operable to receive P2P requests seeking other P2P peers that store specific content and to respond to such requests with information indicating which P2P peers can provide some requested content. In another example, P2P peer logic 306 may be a client operable to generate a P2P request in response to user input, and to send such P2P requests to other P2P peers. In general, P2P peer logic 306 may be operable to perform any functionalities that may be implemented according to one or more P2P protocols; for this reason, the example functionalities of the P2P peer logic described herein are to be regarded in an illustrative rather than a restrictive sense.

According to the techniques described herein, computer host 302 also comprises IGP logic 308, SPT data structure 305, and service request and selection logic 310.

IGP logic 308 is a set of software and/or hardware components that are operable to receive, store, and maintain IGP information. For example, IGP logic 308 may be operable to provide a full range of IGP functionalities including, but not limited to, receiving IGP information from one or more network elements such as network element 320, storing received IGP information in SPT data structure 305, and computing routes and network paths based on the stored IGP information. In various embodiments, IGP logic 308 may be implemented as one or more software components that are executable by one or more processors, as one or more hardware components such as Application-Specific Integrated Circuits (ASICs), or as any combination of one or more software and hardware components.

According to the techniques described herein, in an example embodiment IGP logic 308 may be configured to operate in a IGP listen-only mode. In such listen-only mode, IGP logic 308 is operable to send out IGP messages that include information that notifies the network elements from which the IGP information is received not to sent any network traffic for forwarding to IGP logic 308. Examples of such IGP messages include OSPF messages with an overload bit that is set and IS-IS messages that include a "link max" metric value which indicates that the sender of the messages does not forward traffic.

SPT data structure 305 is any data structure or routing database that is operable to store IGP information. According to the techniques described herein, SPT data structure 305 is configured for storing attribute information that is sent within the received IGP information, where the attribute information may include attribute values that are associated with content servers and/or with the communication links on the network paths from such content servers.

Service request and selection logic 310 is a set of software and/or hardware components that are operable according to the techniques described herein to select content servers based on attribute information stored in SPT data structure 305. In various embodiments, service request and selection logic 310 may be implemented as one or more software components that are executable by one or more processors, as one or more hardware components such as ASICs, or as any combination of one or more software and hardware components.

In one operational example, P2P peer logic 306 in computer host 302 may be configured to perform the functionalities of a central directory or a central server in P2P network. In this operational example, when P2P peer logic 306 receives a request that seeks a P2P peer (e.g., a content server) that can provide some specified content, P2P peer logic 306 invokes or otherwise requests from service request and selection logic 310 to select a P2P peer that can provide the specified content. Service request and selection logic 310 inspects SPT data structure 305, and based on the IGP information and attribute information stored therein selects a P2P peer in accordance with the techniques described herein. Service request and selection logic 310 then sends, or returns to, P2P peer logic 306 information which identifies the selected P2P peer. P2P peer logic 306 then responds to the received request by sending to the requester the information which identifies the selected P2P peer. Thereafter, the requester may send a request for content to the selected P2P peer, which may be a content server or P2P peer that has the requested content.

In another operational example, P2P peer logic 306 may be a client configured to initiate requests for content in response to input from users of computer host 302. In this operational example, when P2P peer logic 306 receives user input that requests some specified content, P2P peer logic 306 determines (on its own or by contacting a central directory or server) which P2P peers can provide the requested content. P2P peer logic 306 then invokes, or otherwise requests from, service request and selection logic 310 to select one P2P peer from the P2P peers that can provide the specified content. Service request and selection logic 310 inspects SPT data structure 305, and based on the IGP information and attribute information stored therein selects a P2P peer in accordance with the techniques described herein. Service request and selection logic 310 sends, or returns to, P2P peer logic 306 information which identifies the selected P2P peer. P2P peer logic 306 then sends the request for content directly to the selected P2P peer.

In this manner, the techniques described herein provide for optimizing network resources usage in the one or more networks of an administrative boundary that is configured for transferring content for one or more P2P networks.

5.0 Example Embodiments for a Network Infrastructure Element

In some embodiments, the techniques for optimizing network resources usage described herein may be implemented in a network element that is configurable to route traffic in a packet-switched network.

For example, in one embodiment a network element is operable to perform the techniques described herein in order to optimize network traffic that carries content to and from network entities (such as computer hosts and content servers) that are configured within one or more networks that comprise an administrative boundary. In another example, in one embodiment a network element is operable to perform the techniques described herein in order to optimize traffic to and from an application service that is provided by a network server in a packet-switched network. In this example, the application service may be a service that provides content or may be any other type of networked service.

In one embodiment, a network element operable to perform the techniques described herein may be configured at the edge of a network that is configured to carry transit network traffic to and from other networks. For example, an Autonomous System Border Router (ASBR) may be configurable to perform the techniques described herein in order to optimize transit traffic that carries content from content servers that are established in other administrative boundaries. The ASBR may use the techniques described herein to optimize network traffic by selecting other ASBRs in its own network that are configured as the exit points to content servers configured in networks of other administrative boundaries. For instance, an embodiment which uses the techniques described herein to optimize traffic between ASBRs may be implemented in the network(s) of an ISP that carries transit content traffic to and from the network(s) of other ISPs.

Figure 3B:
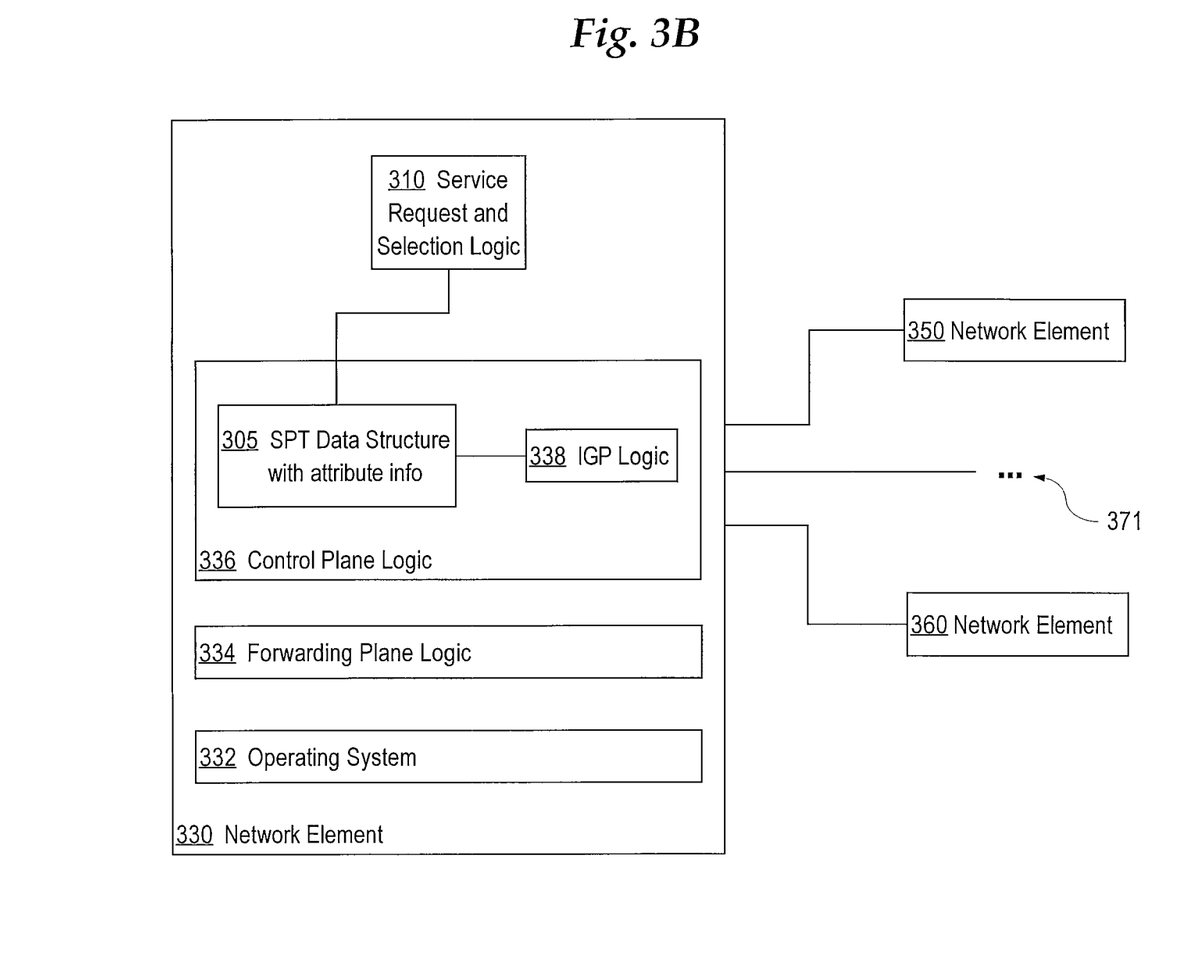
FIG. 3B illustrates an example network infrastructure element according to one embodiment.

FIG. 3B illustrates an example network infrastructure element according to one embodiment. Network element 330 is configurable in a packet-switched network (not shown) to communicatively connect to, and exchange IGP routing information with, other network elements such as network elements 350 and 360. Depending on the particular characteristics of the network, network element 330 may be configurable to communicatively connect and exchange IGP routing information with any number of network elements as indicated by ellipses 371.

Network element 330 comprises operating system 332, forwarding plane logic 334, and control plane logic 336. Network element 330 may further comprise other components that are not shown in FIG. 3B such as, for example, a plurality of network interfaces.

Operating system 332 comprises components that are operable to provide the low level functionalities relied upon by the other components in network element 330. For example, operating system 332 may include components operable to provide route management and route computation functionalities, as well as components operable to process and switch incoming packets from one or more incoming network interfaces to one or more outbound network interfaces.

Control plane logic 336 is a set of hardware and/or software components that are operable to send network management information to other network elements, to receive network management information from other network elements, and to use the network management information to determine and maintain various types of routes, paths, and other routing information to network elements in the network. Depending on the architecture of network element 330, in some embodiments control plane logic 336 may be implemented as one or more software and/or hardware components that operate under the control of operating system 332. In other embodiments, control plane logic 336 may be implemented on a blade that is operatively coupled to the backplane of network element 330. In various embodiments, control plane logic 336 may be implemented as one or more software components that are executable by one or more processors, as one or more hardware components such as ASICs, or as any combination of one or more software and hardware components.

Forwarding plane logic 334 is set of hardware and/or software components that are operable to provide forwarding functionality for network traffic based on routing information received, stored, and processed by the components in control plane logic 336. For example, forwarding plane logic 334 may include one or more components that are operable to receive a packet on an incoming network interface, to determine an outbound network interface on which to forward the received packet based on address information included in the packet and on routing information maintained by control plane logic 336, to transfer the packet to the determined outbound network interface, and to send the packet out from that outbound network interface. Depending on the architecture of network element 330, in some embodiments forwarding plane logic 334 may be implemented as one or more software and/or hardware components that operate under the control of operating system 332. In other embodiments, forwarding plane logic 334 may be implemented on a blade that is operatively coupled to the backplane of network element 330. In various embodiments, forwarding plane logic 334 may be implemented as one or more software components that are executable by one or more processors, as one or more hardware components such as ASICs, or as any combination of one or more software and hardware components.

According to the techniques described herein, network element 330 also comprises IGP logic 338, SPT data structure 305, and service request and selection logic 310. For purely illustrative purposes, FIG. 3B depicts IGP logic 338 and SPT data structure 305 as components included in control plane logic 336. However, in various embodiments IGP logic 338, SPT data structure 305, and service request and selection logic 310 may be implemented as standalone components and/or as sub-components included in various components other than control plane logic 336. For this reason, the example arrangement of IGP logic 338, SPT data structure 305, and service request and selection logic 310 depicted in FIG. 3B is to be regarded in an illustrative rather than a restrictive sense.

IGP logic 338 is a set of software and/or hardware components that are operable to receive, store, and maintain IGP information that is propagated through a network over one or more IGP protocols such as OSPF and IS-IS. For example, IGP logic 338 may be operable to provide a full range of IGP functionalities including, but not limited to, exchanging IGP information with one or more network elements such as network elements 350 and 360, storing received IGP information in SPT data structure 305, and computing routes and network paths based on the stored IGP information. In various embodiments, IGP logic 338 may be implemented as one or more software components that are executable by one or more processors, as one or more hardware components such as ASICs, or as any combination of one or more software and hardware components.

SPT data structure 305 is any data structure or routing database that is operable to store IGP information. According to the techniques described herein, SPT data structure 305 is configured for storing attribute information that is sent within the received IGP information, where the attribute information may include attribute values that are associated with content servers and/or with the communication links on the network paths from such content servers.

Service request and selection logic 310 is a set of software and/or hardware components that are operable according to the techniques described herein to select content servers based on attribute information stored in SPT data structure 305. In various embodiments, service request and selection logic 310 may be implemented as one or more software components that are executable by one or more processors, as one or more hardware components such as ASICs, or as any combination of one or more software and hardware components. Depending on the architecture of network element 330, in some embodiments service request and selection logic 310 may be implemented as one or more software and/or hardware components that operate under the control of operating system 332. In other embodiments, service request and selection logic 310 may be implemented on a blade that is operatively coupled to the backplane of network element 330.

In one operational example, network element 330 may be configured according to the techniques described herein to process requests for content that are received from various network entities such as, for example, various clients, P2P peers, and other networked processes, programs, and applications. In this operational example, when network element 330 receives a request for content that is sent to a content server within the network, service request and selection logic 310 is invoked to determine a content server that can provide the requested content. Service request and selection logic 310 inspects SPT data structure 305, and based on the IGP information and attribute information stored therein selects from multiple content servers a content server in accordance with the techniques described herein. Based on the information which identifies the selected content server, network element 330 causes the received request to be sent to the selected content server. For example, network element 330 or a component thereof can forward the received request to the selected content server. In another example, network element 330 or a component thereof may respond to the requester with the information identifying the selected content server. Based on that information, the requester can then re-write the content request and re-send it to the selected content server over the selected optimal path.

In this manner, the techniques described herein provide for optimizing network resources usage by network elements configurable in one or more networks of an administrative boundary.

6.0 Implementation Mechanisms—Hardware Overview

Figure 4:
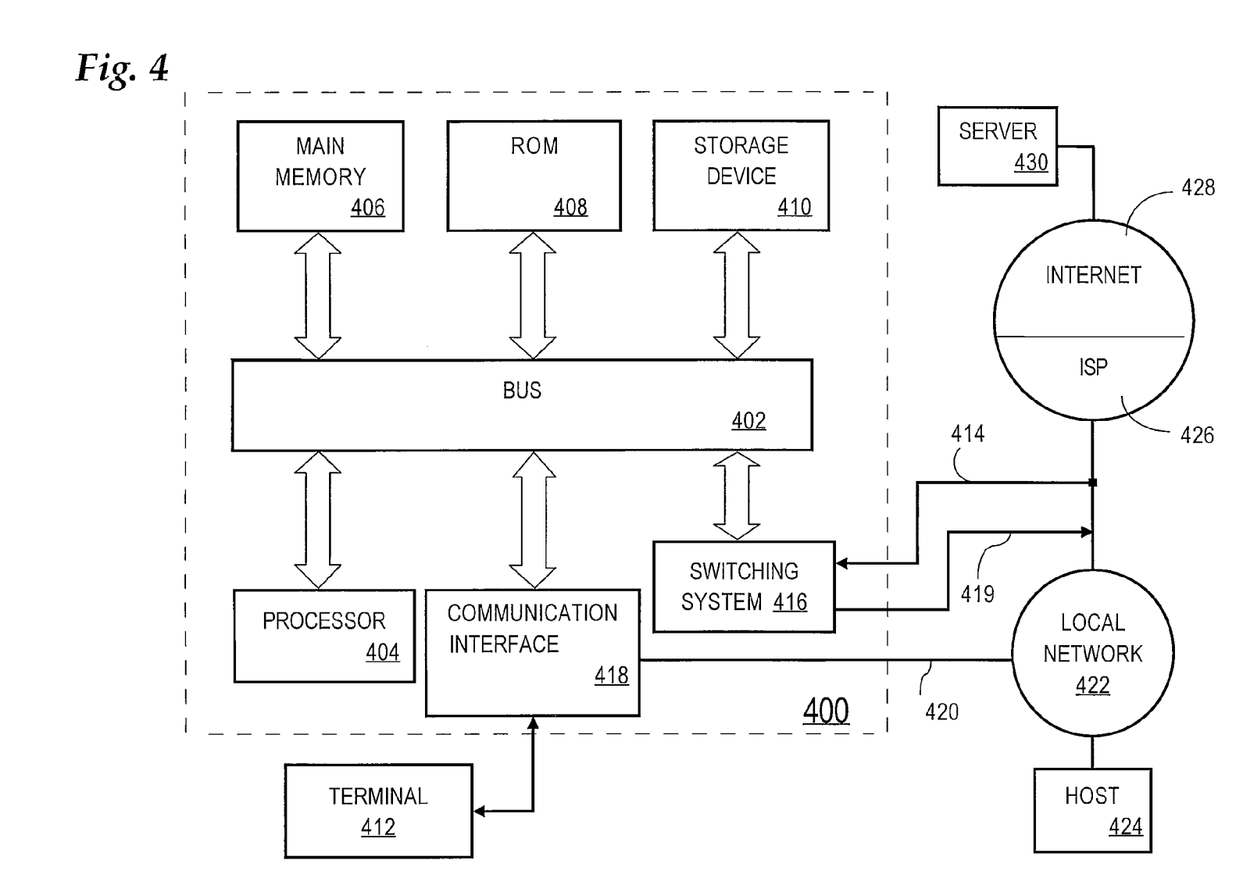
FIG. 4 illustrates a computer system.

FIG. 4 is a block diagram that illustrates a computer system 400 upon which an embodiment of the techniques described herein may be implemented. Example embodiments may be implemented using one or more computer programs and/or one or more ASICs executing on a network infrastructure element such as a router or a switch. Thus, in one embodiment the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for optimizing network resources usage in an administrative boundary. According to one embodiment, optimizing network resources usage is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a machine to operation in a specific fashion. In an embodiment implemented using computer system 400, various computer-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine such as, for example, a computer system.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for optimizing network resources usage as described herein.

The received code may be executed by processor 404 as it is received, and/or stored in storage device 410, or other non-volatile storage for later execution. In this manner, computer system 400 may obtain application code in the form of a carrier wave.

7.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus comprising:
one or more processors;
Interior Gateway Protocol (IGP) logic encoded in one or more tangible media for execution and when executed operable to store IGP information, wherein the IGP information includes a set of attribute values associated with each of a set of content servers; and
selection logic encoded in one or more tangible media for execution and, when executed by the one or more processors, operable to:
receive a request for content from a remote peer;
determine one or more content servers, of the set of content servers, that are operable to provide the content;
retrieve, from the IGP information, a plurality of attribute values associated with a non-looping path from each content server of the one or more content servers, wherein the plurality of attribute values associated with said each content server include:
one or more capacity values indicating capacities of one or more communication links on the non-looping path from said each content server; and
one or more utilization values indicating utilizations of the one or more communication links on the non-looping path from said each content server;
select a particular content server of the one or more content servers based on the plurality of attribute values retrieved for each content server of the one or more content servers; and
cause the request for the content to be sent to the particular content server.

2. The apparatus of claim 1, wherein the apparatus is a packet data router.

3. The apparatus of claim 1, further comprising a Peer-to-Peer (P2P) logic which, when executed by the one or more processors, is operable to process messages conforming to a P2P protocol.

4. The apparatus of claim 3, wherein the IGP logic further is operable to receive the IGP information, but not any network traffic for forwarding, from a router configured in a packet-switched network.

5. The apparatus of claim 1, wherein the selection logic further is operable to forward the request for the content over a particular non-looping path from the selected particular content server.

6. The apparatus of claim 1, wherein the selection logic further is operable to send a message to the remote peer in response to the request, wherein the message includes destination information identifying the particular content server.

7. The apparatus of claim 1, wherein the IGP information is associated with an administrative boundary determined according to one or more IGP protocols.

8. The apparatus of claim 7, wherein the administrative boundary is at least one of an Open-Shortest-Path-First (OSPF) area and an Intermediate System-to-Intermediate System (IS-IS) level.

9. The apparatus of claim 1, wherein the IGP information is stored in a Shortest-Path-Tree (SPT) data structure that is configured for storing the set of attribute values associated with each of the set of content servers.

10. The apparatus of claim 1, wherein at least one capacity value of the one or more capacity values and at least one utilization value of the one or more utilization values are associated with a next-hop communication link on a particular path from said each content server.

11. The apparatus of claim 1, wherein:
at least one content server of the one or more content servers is configured in a first network that is different than a second network in which the apparatus is configured; and
at least one capacity value of the one or more capacity values and at least one utilization value of the one or more utilization values, which are retrieved from the IGP information and are associated with said at least one content server, are associated with a next-hop communication link on a particular path from a border router configured at the edge of the second network, wherein the border router is operable to provide connectivity to the first network in which said at least one content server is configured.

12. The apparatus of claim 1 wherein the plurality of attribute values, retrieved from the IGP information and associated with the non-looping path from said each content server of the one or more content servers, further include:
a capacity value indicating the capacity of said each content server; and
an utilization value indicating the utilization of said each content server.

13. A computer-readable storage medium storing one or more sequences of instructions which, when executed, are operable to:
store Interior Gateway Protocol (IGP) information, wherein the IGP information includes a set of attribute values associated with each of a set of content servers;
receive a request for content from a remote peer;
determine one or more content servers, of the set of content servers, that are operable to provide the content;
retrieve, from the IGP information, a plurality of attribute values associated with a non-looping path from each content server of the one or more content servers, wherein the plurality of attribute values associated with said each content server include:
one or more capacity values indicating capacities of one or more communication links on the non-looping path from said each content server; and
one or more utilization values indicating utilizations of the one or more communication links on the non-looping path from said each content server;
select a particular content server of the one or more content servers based on the plurality of attribute values retrieved for each content server of the one or more content servers; and
cause the request for the content to be sent to the particular content server.

14. The computer-readable storage medium of claim 13, wherein the one or more sequences of instructions are executable in a packet data router.

15. The computer-readable storage medium of claim 13, wherein the one or more sequences of instructions further comprise instructions which, when executed, are operable to process messages conforming to a Peer-to-Peer (P2P) protocol.

16. The computer-readable storage medium of claim 15, wherein the instructions operable to store the IGP information further comprise instructions which, when executed, are operable to receive the IGP information, but not any network traffic for forwarding, from a router configured in a packet-switched network.

17. The computer-readable storage medium of claim 13, wherein the instructions operable to cause the request for the content to be sent to the particular content server further comprise instructions which, when executed, are operable to forward the request for the content over a particular non-looping path from the selected particular content server.

18. The computer-readable storage medium of claim 13, wherein the instructions operable to cause the request for the content to be sent to the particular content server further comprise instructions which, when executed, are operable to send a message to the remote peer in response to the request, wherein the message includes destination information identifying the particular content server.

19. The computer-readable storage medium of claim 13, wherein the IGP information is associated with an administrative boundary determined according to one or more IGP protocols.

20. The computer-readable storage medium of claim 19, wherein the administrative boundary is at least one of an Open-Shortest-Path-First (OSPF) area and an Intermediate System-to-Intermediate System (IS-IS) level.

21. The computer-readable storage medium of claim 13, wherein the IGP information is stored in a Shortest-Path-Tree (SPT) data structure that is configured for storing the set of attributes associated with each of the set of content servers.

22. The computer-readable storage medium of claim 13, wherein at least one capacity value of the one or more capacity values and at least one utilization value of the one or more utilization values are associated with a next-hop communication link on a particular path from said each content server.

23. The computer-readable storage medium of claim 13, wherein:
at least one content server of the one or more content servers is configured in a first network that is different than a second network in which the apparatus is configured; and
at least one capacity value of the one or more capacity values and at least one utilization value of the one or more utilization values, which are retrieved from the IGP information and are associated with said at least one content server, are associated with a next-hop communication link on a particular path from a border router configured at the edge of the second network, wherein the border router is operable to provide connectivity to the first network in which said at least one content server is configured.

24. The computer-readable storage medium of claim 13 wherein the plurality of attribute values, retrieved from the IGP information and associated with the non-looping path from said each content server of the one or more content servers, further include:
a capacity value indicating the capacity of said each content server; and
an utilization value indicating the utilization of said each content server.

25. A computer-implemented method comprising:
storing Interior Gateway Protocol (IGP) information, wherein the IGP information includes a set of attribute values associated with each of a set of content servers;
receiving a request for content from a remote peer;
determining one or more content servers, of the set of content servers, that are operable to provide the content;
retrieving, from the IGP information, a plurality of attribute values associated with a non-looping path from each content server of the one or more content servers, wherein the plurality of attribute values associated with said each content server include:
one or more capacity values indicating capacities of one or more communication links on the non-looping path from said each content server; and
one or more utilization values indicating utilizations of the one or more communication links on the non-looping path from said each content server;

selecting a particular content server of the one or more content servers based on the plurality of attribute values retrieved for each content server of the one or more content servers; and causing the request for the content to be sent to the particular content server; wherein the method is performed by a computer system.

* * * * *